United States Patent [19]
Robbins

[11] Patent Number: 4,528,671
[45] Date of Patent: Jul. 9, 1985

[54] MULTIPLE HOST FACE-PUMPED LASER

[75] Inventor: Alexander G. Robbins, Vestal, N.Y.

[73] Assignee: General Electric Company, Burlington, Vt.

[21] Appl. No.: 602,841

[22] Filed: Apr. 23, 1984

Related U.S. Application Data

[63] Continuation-in-part of Ser. No. 317,134, Nov. 2, 1981, abandoned.

[51] Int. Cl.³ .............................................. H01S 3/14
[52] U.S. Cl. ....................................... 372/68; 372/71; 372/66; 372/35
[58] Field of Search ................. 372/62, 68, 71, 66, 372/67, 51, 54, 72, 35

[56] References Cited

U.S. PATENT DOCUMENTS

| | | | |
|---|---|---|---|
| 3,810,040 | 5/1974 | Martin et al. | 372/68 |
| 3,810,041 | 5/1974 | Martin | 372/68 |
| 4,207,541 | 6/1980 | Karger et al. | 372/71 |
| 4,233,567 | 11/1980 | Chernock | 372/72 |

Primary Examiner—James W. Davie
Assistant Examiner—Léon Scott, Jr.
Attorney, Agent, or Firm—Bailin L. Kuch

[57] ABSTRACT

A total internal reflection, face pumped laser is provided, in a single head, with two (or more) generally parallel, spaced apart hosts for providing a higher average power output than the typical single host FPL. A pair of flash lamps, one each adjacent the outer surface of each host, acts as the "pumping" means for the laser and operates in effect to produce asymmetrical pumping of the respective hosts. In order to prevent exceeding the thermal stress limit and thermally inducing bending of the hosts, a system of asymmetrical cooling is provided whereby a greater flow of fluid coolant is provided the surfaces of the two hosts which are closer to the "pumping" flash lamps than to the inner host surfaces which are proximate one another.

9 Claims, 3 Drawing Figures

MULTIPLE HOST FACE-PUMPED LASER

RELATED APPLICATIONS

This application is a continuation-in-part of Ser. No. 317,134 filed Nov. 2, 1981, now abandoned.

BACKGROUND OF THE INVENTION

1. Field of the Invention

This invention relates to a face pumped laser, and more particularly, to such a laser providing in one head a plurality of laser hosts allowing a greater volume of host material and therefore higher average power laser output while maintaining the benefits of the face pumped, total internal reflection laser technique.

2. Description of the Prior Art

It is well known in the art that laser devices emit electromagnetic radiation of wavelengths generally in the infrafred and visible portions of the electromagnetic spectrum. The radiation emission is substantially coherent and is characterized by a narrow wavelength band.

Laser devices are operable using a suitable medium or host in which a population inversion may be established in a particular metastable energy level by proper optical "pumping". Neodymium glass, ruby, helium, neon, and carbon dioxide are media which are commonly employed in lasers. By "pumping" or irradiating the active medium with electromagnetic radiation possessing power necessary to create the population inversion, conditions permitting coherent emission may be obtained. The means emitting the radiation causing inversion is called "pumping means" while the wavelength of the radiation is known as the "pumping wavelength".

Laser devices which emit high energy pulses are well known in the art as pulsed lasers. The emitted pulses, though high in energy, are short in duration, lasting on the order of milliseconds to picoseconds.

The laser output is only a small percentage of the input energy, a large percentage of the energy ending up as heat in the laser medium. In pulsed lasers, one or more surfaces of the active medium are cooled in order to extract the excess heat. Because of the limited thermal conductivity of the host material, the excess heat is more rapidly removed from near the surface than from the interior, causing the center of the host to be warmer than the surface. Repeated operation of the laser host, precluding a proper cooling period, causes a substantial thermal gradient to be established, resulting in possible strutural failure or distortion of the output beam. Lasers employing host materials characterized by low thermal conductivities are particularly limited to low pulse repetition rates.

Recent interest in high repetition rates of pulsed lasers has led to increased activity in this field. Since a number of materials, particularly those of the doped glass species, which are employed as the active laser host have low thermal conductivity, several approaches have been taken to overcome this restraint on pulse repetition rate. These approaches have in common the segmenting of a side-pumped, rod type laser host and interspersing of a flowing coolant. The result of this procedure is that the unwanted heat is more quickly removed through the relatively smaller dimension of the segmented laser host material and therefore the composite arrangement can be operated at higher pulse repetition rates without structural failure due to thermally induced stress.

The general form of these multi-segment rod type lasers as shown in U.S. Pat. No. 3,715,682 issued to Young have glass discs which are generally edge pumped and therefore have some radial thermal gradients due to non-uniform pumping. These radial gradients result in degradation of the beam coherence. Optical compensation can be introduced as shown in U.S. Pat. No. 3,675,152 issued to Young. The radial refractive index gradient compensation means utilized requires that thermal equilibrium be reached before the laser pulse has full energy and good coherence. An alternative optical compensation means is the multipath array as shown in U.S. Pat. No. 3,628,179 issued to Cuff et al. This compensates for transverse temperature gradients due to coolant flow but does not compensate for the residual radial temperature gradient due to nonuniform pumping. All of the above multiple-segment rod type lasers have in common the limitation that the lasing energy passes through the coolant. When high energy and high repetition rates are employed, the lasing energy is partially absorbed by the coolant. This creates thermal gradients and thus index of refraction gradients which cause serious optical distortion or loss of coherence in the lasing beam.

Presently face pumped lasers are advantageously employed as pulsed lasers. A face pumped laser permits substantially uniform activation and concomitant heating across the laser aperature in contract to the nonuniform optical properties of the side-pumped, rod-type laser device. U.S. Pat. No. 3,631,361—Almasi et al., assigned to the same assignee as the present invention, discloses an arrangement for substantially increasing the pulse repetition rate of face-pumped laser devices by eliminating the distortion due to nonuniform heating. The losses and the distortion due to the laser output beam passing through the interspersed coolant flow remain.

The face pumped laser with total internal reflection when uniformly activated has intrinsic beam wave front compensation for thermal gradients within the laser host and no wave front distortion due to laser output beam passage through the coolant. These characteristics are advantageously utilized for high average power, high beam intensity and high repetition rate lasers. Examples of this art are U.S. Pat. No. 3,633,126 issued to Martin et al and U.S. Pat. No. 4,214,216 issued to Jones, Jr., both assigned also to the same assignee as the present invention.

A unique characteristic of the face pumped laser with total internal reflection is that the laser beam is directed through the laser host by means of total internal reflections from the major faces which also admit the pumping radiation. Thus maintaining the optical alignment and, hence, the performance of a laser resonator that incorporates a face pumped laser host with total internal reflections is dependent upon maintaining the laser host major faces substantial flat and parallel. The potential means of disturbing the resonator alignment is to cause flexure of the laser host by either inadequate support or unequal heating (or cooling) of the major faces. Flexure of the laser host curves the major face where the total internal reflection occurs and cause the exiting laser beam to be non-parallel to the entering laser beam. Thus all faced pumped lasers with total internal reflections require proper means of supporting and cooling the laser host to ensure that there is no flexure of the laser host to cause misalignment that results in degraded performance.

A problem not solved by prior art for the face pumped laser with total internal reflection, however, is the provision, in one head, of a greater volume of laser host material without exceeding thermal stress limitations and without thermally inducing bending of the laser host body. The prior art for the face pumped laser with total internal reflection utilizes a single slab of laser host material wherein the vertical dimension, thickness, of the slab is limited by the stress induced by the thermal gradient from the hot center line to the cooled upper and lower surface of the host.

Consequently, a need exists for a face pumped laser with total internal reflection, e.g., the laser beam is entirely reflected off the two large opposed plane faces, in a zig-zag manner down the length of the slab, having a higher average power output but which retains nevertheless the benefits of the face pumped, total internal reflection laser technique.

It is, therefore, an object of the present invention to provide a greater volume of laser host material in a face pumped laser with total internal reflection so as to yield higher average power output.

It is a further object of the present invention to provide a multiple laser host body in a face pumped laser with total internal reflection which can yield higher average power output without increasing significantly the overall size of the laser.

It is a further object of the present invention to provide such a multiple laser host body in a face pumped laser with total internal reflection without exceeding the thermal stress limit in and without thermally inducing flexure or bending of the laser host body.

Other objects and advantages of the present invention will become apparent as the description thereof proceeds.

SUMMARY OF THE INVENTION

In accordance with the present invention, there is provided a multiple host face pumped laser with total internal reflection. Included are at least two elongated homogeneous bodies of an active laser host, the laser bodies each having a longitudinal axis and at least two optically plane faces extending substantially parallel to each other and to the longitudinal axis. The laser host bodies are arranged in a spaced-apart, typically less than 0.1 in., arrangement such that their respective optically plane faces and longitudinal axis are generally parallel. Pumping means are included for providing electromagnetic radiation to impinge upon one of the optically plane faces of the laser host bodies and to enter at least one of the laser host bodies; at least some of the radiation passes through the laser host body to exit therefrom thence to impinge upon one of the optically plane faces of a second laser host body and to enter a second laser host body thereby to excite atoms of the laser host bodies to a metastable state thereby producing a population inversion therein. Also included are means for passing a fluid coolant across the optically plane faces of the laser host bodies for extracting heat generated within the laser bodies. In the preferred embodiment, the coolant passing means includes means for effecting cooling of the optically plane faces to approximately the same temperature so as to obviate thermally induced bending of the laser host bodies.

DESCRIPTION OF THE PREFERRED EMBODIMENT

Figures 1, 2:
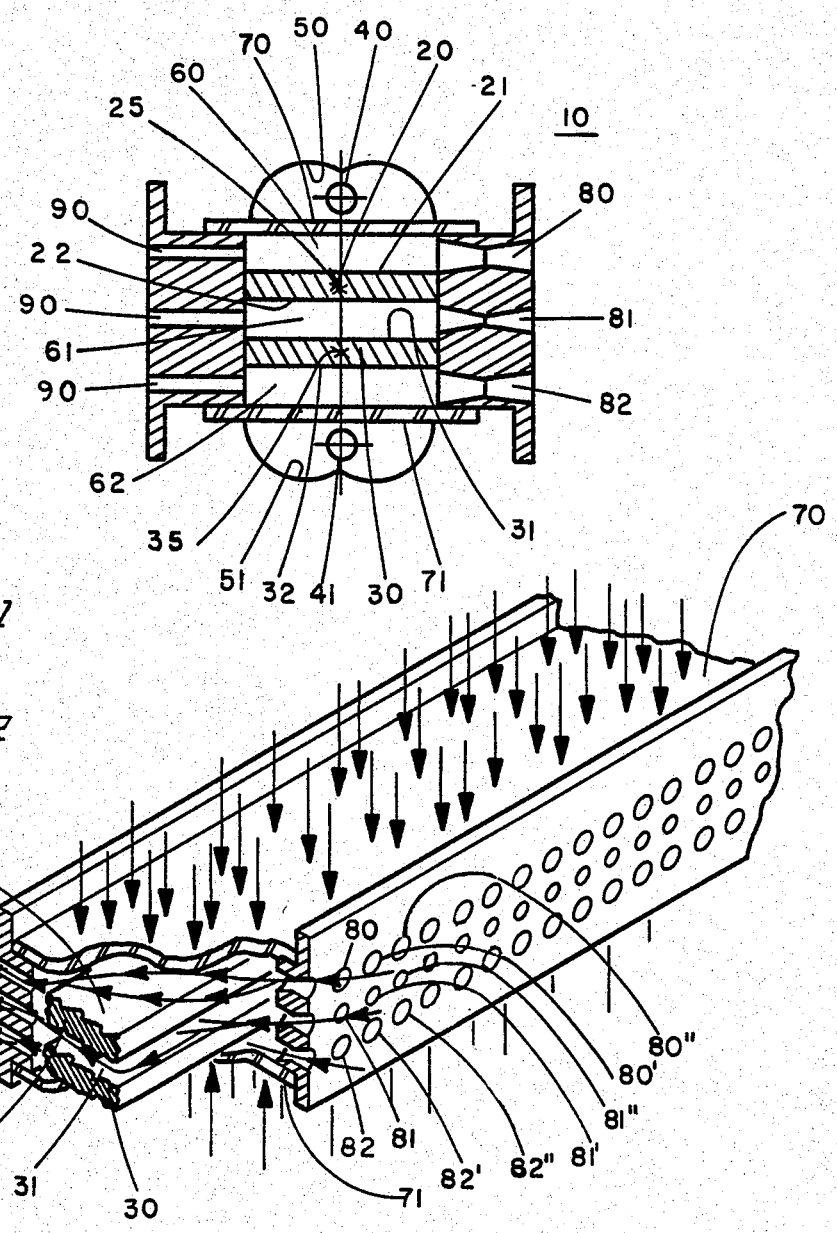
FIG. 1 shows an end elevational view, in cross section, of the preferred embodiment of the multiple host, face pumped laser with total internal reflection of the present invention.
FIG. 2 shows, in perspective, a partial, cutaway view of the laser of FIG. 1.
Figure 3:
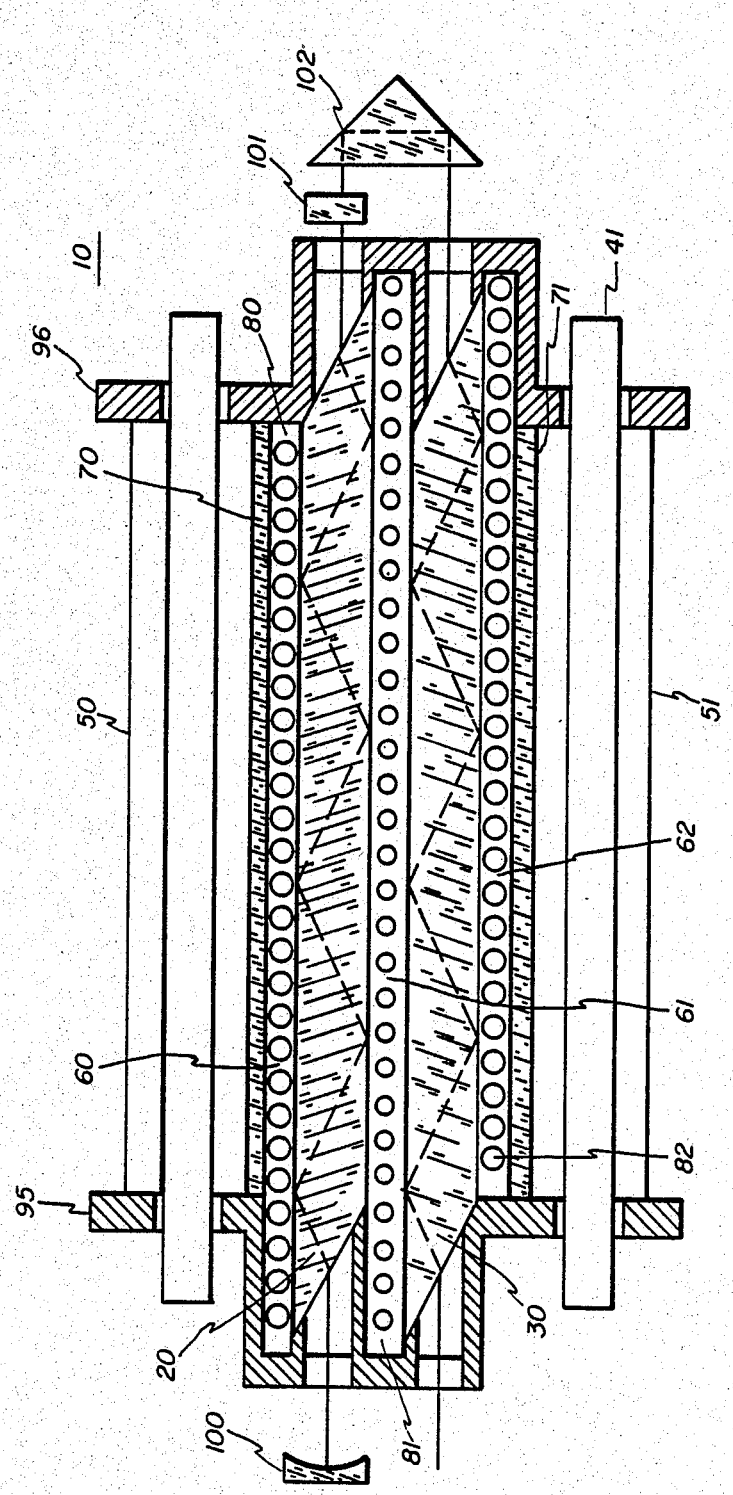
FIG. 3 shows a side elevational view, in cross section, of FIG. 1 with the associated optics to form a laser resonant cavity and a laser amplifier.

In accordance with the present invention, and referring now generally to the drawings, there is shown the preferred embodiment of the multiple host face pumped laser with total internal reflection 10 of the present invention. A pair of elongated homogeneous bodies of an active laser host 20 and 30 are provided. Neodymium doped yttrium-aluminum-garnet, ND:YAG, has been chosen for this application. Each of the laser hosts 20 and 30 has a longitudinal axis 25 and 35 respectively, and at least two optically plane faces 21, 22, and 31, 31 respectively, extending substantially parallel to each other and to the longitudinal axis. Laser hosts 20 and 30 are arranged in a spaced-apart, typically less than 0.1 in., relationship as shown such that their respective optically plane faces and longitudinal axis are generally parallel.

Pumping means include a pair of flash lamps 40 and 41 which serve to provide electromagnetic radiation (represented in FIG. 2 by arrows) to impinge upon one of the optically plane faces of at least one of the laser hosts 20 and 30. In the preferred embodiment, as shown, flash lamp 40 provides radiation to impinge upon optically plane face 21 of and to enter laser host 20 and makes use of a reflector 50 which serves to insure that a large portion of the radiation emitted by the lamp does reach the laser host 20. The portion of the flash lamp 40 radiation transmitted through laser host 20 impinges upon optically plane face 31 and enter laser host 30. The portion of the flash lamp radiation not absorbed by laser host 30 impinges on reflector 51 and reflects toward the laser hosts. The absorption and reflection continues until the flash lamp radiation is expended. Likewise, flash lamp 41 and its associated reflector 51 provide radiation to impinge upon optically plane face 32 of and to enter laser host 30. The portion of flash lamp 41 radiation transmitted through laser host 30 continues in the same manner as described for the radiation of flash lamp 40. Radiation from the flash lamps 40 and 41 entering the hosts 20 and 30 serves to excite atoms of the laser host bodies to a metastable state thereby producing a population inversion therein.

In a face pumped laser host material such as the slabs 20 and 30, optical distortion effects occur as the slab undergoes heating during its operation. Means are therefore provided for passing a fluid coolant across the optically plane faces of the laser host bodies 20 and 30 for extracting heat generated within the host material, these including the cavities 60, 61, and 62. Fluid tight cavities 60 and 62 are formed in part by a pair of windows 70 and 71 which allow the radiation emitted from the flash lamps 40 and 41 to pass therethrough while serving to retain the fluid coolant being passed across the optically plane faces 21 and 322 respectively of the laser hosts 20 and 30. A series of nozzles 80, 80', 80", etc., 81, 81', etc. and 82, 82, etc., serve to restrict and passively regulate, via their orifice size, the flow of coolant to be pumped into each of the cooling cavities 60, 61, and 62 respectively and to exit through ports 90 for effecting cooling of the optically plane faces of the hosts 20 and 30.

The spherical mirror 100 and the partially reflecting flat mirror 101 comprise the laser resonant cavity containing laser host 20. Porro prism 102 turns the resonant cavity output back into laser host 30 for laser amplification.

However, as can be seen, each of the laser hosts 20 and 30 is asymmetrically pumped. That is, the slab surfaces adjacent to the cooling channel 61 receive less optical pumping energy than the faces adjacent to channels 60 and 62. This is caused by absorption of the flash lamp radiation as it passes through the laser host to the surfaces adjacent to the cooling passage 61. The result is asymmetrical heating which tends to make the laser host slab bend. If this bending or flexing were to be allowed, the laser beam would be deflected through the total internal reflections of the face pumped laser and the output beam would not be parallel to the input beam. Such misalignment would seriously degrade the performance of the laser resonant cavity, misalign the beam in the laser amplifier and misalign the laser beam at the point of its intended use. Advantageously therefore, nozzles 81, 81', 81", etc. to coolant passage 61 are made smaller than the nozzles to channels 60 and 62 so that the fluid coolant velocity through channel 61 is decreased to the point that the optically plane faces of the laser hosts which are adjacent to channel 61 are maintained at essentially the same temperature as the optically plane faces which are adjacent to channels 60 and 62. By balancing asymmetrical heating with asymmetrical cooling, each laser host body has essentially the same top and bottom surface temperatures and hence does not bend and cause misalignment of the beams.

If desired, flash lamps 40 and 41 may also be cooled through the use of a suitable fluid coolant, as for example shown in U.S. Pat. No. 4,207,541, Karger et al., also assigned to same assignee as the present invention. In that arrangement, a flash lamp is placed within a concentric tubing which receives and allows to pass therethrough a liquid coolant which serves to take away excess heat from the flash lamp.

The description and figures herein apply specifically to a dual host laser body; however, the invention will apply equally as well to three, four or more laser host bodies arrayed in similar fashion, with appropriate compensation in the coolant flow for each coolant channel.

The coolant chosen for use in the preferred embodiment is ethylene glycol and water, but other suitable coolants such as water, alcohol, fluorocarbons, gases, etc. may be used. Also, while ND:YAG has been selected as the preferred host material, and which is available from Airtron, Inc. of Morris Plains, N.J., other suitable hosts, such as neodymium doped phosphate or silicate glasses, ruby and Alexandrite may be used.

While a stable resonator has been described, any other type of resonator such as unstable, crossed Porro, etc. may be used. The preferred embodiment describes one laser host used only for a laser resonator and the other laser host used only for a laser amplifier. Other arrangements such as a laser resonator in a portion of one laser host and one or more laser amplifier beams in the remainder of that laser host may be used. The multiple host laser body may also be used entirely for laser amplication of a laser resonator output beam supplied by another source.

While a multiple host face pumped laser with total internal reflection has been described in what is presently considered to be a preferred embodiment of the invention, it will be apparent to those skilled in the art that various changes and modifications may be made in the structure and in the instrumentalities utilized without departing from the true spirit and scope of the invention.

What is claimed is:

1. A multiple host face pumped laser with total internal reflection, comprising:

an enclosure;

two elongated homogeneous bodies of an active host disposed in said enclosure, said laser host bodies each having a respective longitudinal axis and two optically plane faces extending substantially parallel to each other and to said longitudinal axis, said laser host bodies being arranged in a mutually spaced apart relationship such that their respective optically plane faces and longitudinal axes are generally parallel;

pumping means for providing electromagnetic radiation to impinge upon one of said optically plane faces of one of said laser host bodies to enter said one laser host body, at least a portion of said radiation passing through said one laser host body to exit therefrom and thence to impinge upon one of the optically plane faces of the second of said laser host bodies to enter said second laser host body, thereby to excite atoms of both of said laser host bodies to a metastable state to produce a population inversion therein;

means coupled by electromagentic radiation to form, with said one laser host body, a laser resonant cavity whereby said population inversion in conjunction with said resonant cavity means generates an output lasing radiation which, by total internal reflections from said optically plane faces, progresses along the respective longitudinal axis of said one laser host body and exits one end of said laser host body; and means for passing a liquid coolant across said optically plane faces of said laser host bodies for extracting heat generated within the laser bodies including means to restrict and passively regulate the flow of coolant separately to each of said optically plane faces to provide a rate of coolant flow to each of said optically plane faces in proportion to its respective rate of heating to cool all of said faces to approximtely the same temperature.

2. A laser according to claim 1 wherein:
said pumping means includes:
at least one source of electromagnetic radiation disposed adjacent one of said optically plane faces of one of said laser host bodies.

3. A laser according to claim 2 wherein:
a reflector is provided to direct radiation from said source toward said laser host bodies.

4. A laser according to claim 2 wherein:
said pumping means further includes a reflector disposed adjacent to the one of said optically plane faces of said second of said laser host bodies most remote from said source to reflect back to said laser host bodies pumping electromagnetic radiation from said source which has passed through said laser host bodies.

5. A laser according to claim 1 wherein:
said pumping means includes at least two sources of electromagnetic radiation, one source each being disposed adjacent the respective outwardly directed optically plane faces.

6. A laser according to claim 5 wherein:
each of said sources of electromagnetic radiation is provided with a respective reflector to direct radiation toward said optically plane faces of said laser host bodies, and to return pumping electromagnetic radiation that has passed through said laser host bodies back toward said laser host bodies.

7. A laser according to claim 1 wherein:
said means for optically establishing a laser resonant cavity includes means for receiving said output lasing radiation from said one body and reflecting a first portion thereof back into said one body and a second portion thereof into the second of said bodies.

8. A multiple host face pumped laser comprising:
an enclosure;
a first source of first pumping electromagnetic radiation;
a first elongated homogeneous body, disposed in said enclosure, of an active laser host having a first longitudinal axis and at least two optically plane first faces extending substantially parallel to each other and to said first longitudinal axis;
a second elongated homogeneous body, disposed in said enclosure, of an active laser host having a second longitudinal axis and at least two optically plane second faces extending substantially parallel to each other and to said first longitudinal axis;
said first and second laser host bodies being arranged in a spaced apart relationship such that their respective longitudinal axes are generally parallel and one each of said first and second optically plane faces are generally parallel, mutually facing, and adjacent, said laser host bodies being aligned such that at least a portion of said first pumping radiation will impinge upon the one of said first faces which is remotely facing, will traverse said first body, will exit said one of said first faces which is mutually facing, will impinge upon said one of said second faces which is mutually facing, will traverse said second body, and will exit said one one of said second faces which is remotely facing;
a second source of second pumping electromagnetic radiation;
said first and second bodies being arranged such that at least a portion of said second pumping radiation will impinge upon the one of said second faces which is remotely facing, will traverse said second body, will exit said one of said second faces which is mutally facing, will impinge upon said one of said first faces which is mutually facing, will traverse said first body, and will exit said one of said first faces which is remotely facing;
means for optically establishing a laser resonant cavity with said first body, whereby said first and second pumping radiations excite atoms of said first body to a metastable state to produce a population inversion therein which generates an output lasing radiation which by total internal reflections from said first faces progresses along said first axis; and
means for passing a fluid coolant across said first and second faces of said respective first and second bodies at rates of flow which are proportional to their respective rates of heating, whereby all of said faces are maintained at substantially the same temperature.

9. A laser according to claim 8 wherein;
said means for optically establishing a laser resonant cavity includes means for receiving said output lasing radiation from said first body and reflecting a first portion thereof back into said first body and a second portion thereof into said second body.

* * * * *